United States Patent
Hildebrand et al.

(10) Patent No.: US 7,127,211 B2
(45) Date of Patent: Oct. 24, 2006

(54) METHOD AND APPARATUS FOR REDUCED INTERMODULATION DISTORTION IN A RADIO TRANSCEIVER

(75) Inventors: Uwe Hildebrand, Erlangen (DE); Thomas Unshelm, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 690 days.

(21) Appl. No.: 10/078,541

(22) Filed: Feb. 21, 2002

(65) Prior Publication Data

US 2004/0048576 A1 Mar. 11, 2004

(51) Int. Cl.
*H04B 1/00* (2006.01)
*H04B 15/00* (2006.01)

(52) U.S. Cl. .................. 455/63.1; 455/67.13; 455/295; 455/296

(58) Field of Classification Search ..... 455/561–562.1, 455/24, 69, 63.1, 126, 249.1, 266, 234.1, 455/245.2, 252, 278.1, 295–296, 67.11–13
See application file for complete search history.

(56) References Cited

U.S. PATENT DOCUMENTS

| | | | | |
|---|---|---|---|---|
| 4,817,198 A | * | 3/1989 | Rinderle | 455/249.1 |
| 5,125,108 A | * | 6/1992 | Talwar | 455/278.1 |
| 5,170,392 A | * | 12/1992 | Riordan | 370/252 |
| 5,222,255 A | * | 6/1993 | Kuo et al. | 455/266 |
| 5,239,683 A | * | 8/1993 | Usui | 455/63.1 |
| 5,428,831 A | | 6/1995 | Monzello et al. | |
| 5,548,813 A | * | 8/1996 | Charas et al. | 455/562.1 |
| 5,551,070 A | * | 8/1996 | Skarby et al. | 455/126 |
| 5,697,081 A | * | 12/1997 | Lyall et al. | 455/249.1 |
| 5,745,839 A | | 4/1998 | Lieberman | |
| 5,752,181 A | | 5/1998 | Vice | |
| 5,757,246 A | | 5/1998 | Johnson | |
| 5,758,271 A | * | 5/1998 | Rich et al. | 455/234.1 |
| 5,781,865 A | * | 7/1998 | Gammon | 455/561 |
| 6,032,031 A | * | 2/2000 | Takaki | 455/245.2 |
| 6,606,488 B1 | * | 8/2003 | Konig et al. | 455/295 |
| 2001/0049264 A1 | * | 12/2001 | Balech | 455/69 |

FOREIGN PATENT DOCUMENTS

| | | |
|---|---|---|
| GB | 2 107 556 | 4/1983 |
| JP | 08056184 | * 2/1996 |
| JP | 10-093461 | 4/1998 |

* cited by examiner

*Primary Examiner*—Matthew D. Anderson
*Assistant Examiner*—Tuan Tran
(74) *Attorney, Agent, or Firm*—Nixon & Vanderhye P.C.

(57) ABSTRACT

A transceiver transmits first and second signals on first and second transmit radio frequencies. After detecting a received signal, intermodulation distortion caused by transmission of the first and second signals is suppressed, reduced, and/or eliminated using information associated with the first and second transmitted signals. More specifically, the information associated with the first and second transmitted signals is used to calculate or otherwise obtain a correction factor that corresponds to the intermodulation distortion. The correction factor is subtracted from the received signal to suppress the intermodulation distortion.

45 Claims, 3 Drawing Sheets

METHOD AND APPARATUS FOR REDUCED INTERMODULATION DISTORTION IN A RADIO TRANSCEIVER

FIELD OF THE INVENTION

The present invention relates to radio communications, and more particularly, to reducing intermodulation distortion.

BACKGROUND AND SUMMARY OF THE INVENTION

Distortion is a significant problem in telecommunication systems. While there are several types, distortion generally can be thought of as some modification of a waveform by introducing features not present in the original waveform or by suppressing or modifying features present in the original waveform. The present invention is particularly concerned with intermodulation distortion. Intermodulation is the modulation of components of a complex wave by each other producing waves having frequencies, among others, equal to the sums and differences of those components of the original wave. In other words, intermodulation distortion results from spurious combination-frequency components in the output of a transmission system.

One environment where intermodulation distortion is a problem is in radio base stations used in mobile telecommunications systems. Such base stations typically include plural transmitters and plural receivers, (i.e., plural transceivers), and may employ a duplexer so that transmitter-receiver pairs can share an antenna for both transmitting and receiving radio frequency signals. For example, in the well-known GSM 900 mobile communications system, the transmit band covers 35 MHz and includes a 175 transmit frequencies approximately 200 KHz wide. Unfortunately, transmissions over certain pairs of these 175 transmit frequencies generate significant intermodulation products in the receive band. As a result, frequency planning methods are required in order to avoid using such frequency pairs. Another problem is that unused frequency pairs reduce the capacity of the base station.

These problems are overcome by compensating for intermodulation distortion in a received signal caused by transmission of first and second signals on first and second transmit radio frequencies. In particular, after detecting a received signal, the intermodulation distortion is suppressed, reduced, and/or eliminated using information that is associated with the first and second transmitted signals. The information associated with the first and second transmitted signals is used to calculate or otherwise obtain a correction factor that corresponds to the intermodulation distortion. The correction factor may be subtracted or otherwise removed from the received signal to suppress the intermodulation distortion.

In a preferred, non-limiting, example embodiment, a compensator in the receiver detects (1) the baseband information corresponding to the first and second transmitted signals, (2) the power level at which the first and second signals were transmitted, (3) the frequencies over which the first and second signals were transmitted, and (4) timing information associated with the transmission of those signals. The baseband information, the power level, and the frequency corresponding to each of the signals are used to calculate or retrieve from a lookup table a compensation factor corresponding to the intermodulation distortion. The timing information is used to synchronize that calculation or table lookup for a particular signal. One or more time delays is used to synchronize when the compensation signal is removed from the received signal. Such delays may take into account a first delay associated with a time period for the first signal to be processed and transmitted via an antenna. A second delay may be associated with a time period for the second signal to be processed and transmitted via the antenna. A third delay may be associated with a time period for receiving a signal via the antenna and processing it through the compensator.

There are a number of benefits of the present invention. For example, it may be implemented without changing existing radio hardware. Parameters in the lookup table may be updated adaptively to account for changes due to temperature, aging, and different behaviors of different frequency pairs. Such a flexible software solution is further advantageous because compensation can be made on an as needed basis adaptively tailored to individual sites and/or base stations. Another potential benefit is that IM distortion requirements on hardware units may be relaxed, which allows for less expensive hardware. Moreover, frequency planning, which otherwise would be required when using a duplexer to avoid intermodulation frequency pairs, is not necessary. As a result, the capacity of a transceiver using a duplexer is not reduced as a result of not using those frequency combinations that result in intermodulation distortion.

BRIEF DESCRIPTION OF THE DRAWINGS

The foregoing and other objects, features, and advantages of the present invention may be more readily understood with reference to the following description taken in conjunction with the accompanying drawings.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. For example, while the present invention is advantageously employed in mobile radio communications systems, the present invention may be employed in any radio transceiver in other types of communications environments. Moreover, while the present invention is described in places in the context of third order intermodulation products, the invention is also applicable to other products, such as fifth order or higher products.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
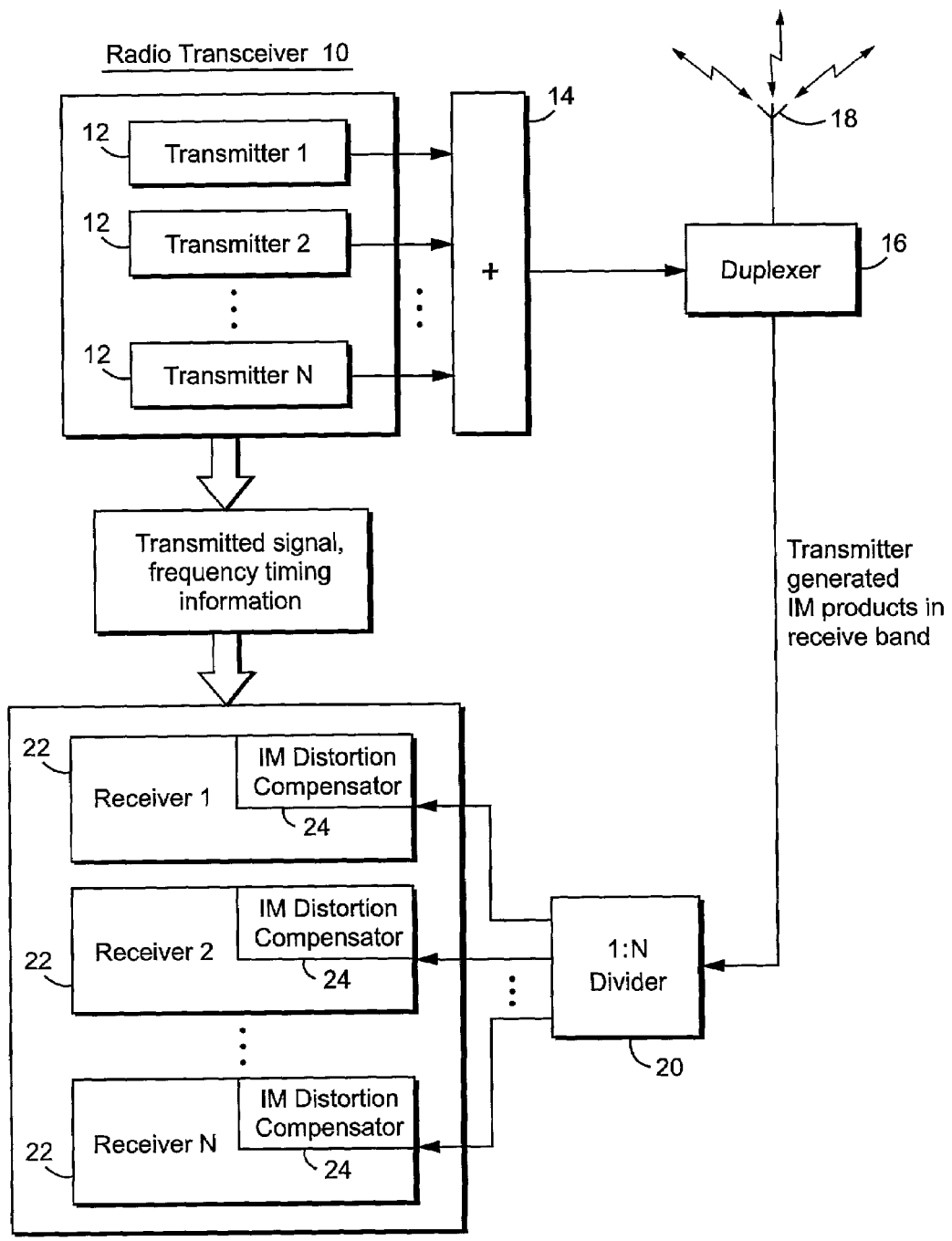
FIG. 1 illustrates an example radio transceiver that compensates for intermodulation distortion.

FIG. 1 illustrates a radio transceiver 10, (e.g., a radio base station), which includes a plurality of radio transmitters 12 labeled transmitter 1, transmitter 2, . . . transmitter N, and a plurality of radio receivers 22 labeled receiver 1, receiver 2, . . . receiver N. The transmitters 12 are coupled to a combiner 14, and the combined output is provided to a duplexer 16 for transmission over antenna 18. The receivers 22 employ the duplexer 16 to receive signals from the same antenna 18 in a receive frequency band. A 1:N divider 20 splits the received signals into a corresponding received signal for each of the receivers 22. Transmitter-generated intermodulation (IM) products in the receive band are included in the received signal output from the duplexer. Each receiver 22 includes an intermodulation distortion compensator 24. Based on transmitted signal, frequency, and timing information provided by the transmitters 12, the intermodulation distortion compensator 24 in each receiver suppresses or otherwise removes the intermodulation products receive frequency in the received band.

Figure 2:
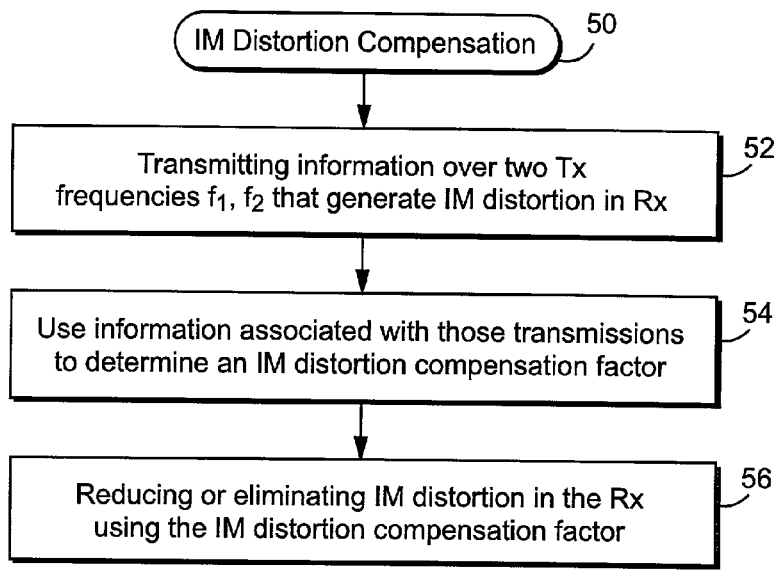
FIG. 2 illustrates an intermodulation compensation methodology.

FIG. 2 illustrates example IM Distortion Compensation procedures (block 50) in flowchart form. In this example, information is transmitted over two transmit Tx frequencies $f_1$, $f_2$ that generate intermodulation distortion in a receive Rx frequency band (block 52). Information associated with those transmissions is used in the intermodulation distortion compensator of the receiver to determine an IM distortion compensation factor (block 54). The IM distortion in the received signal is reduced or eliminated using the IM distortion compensation factor (block 56).

Figure 3:
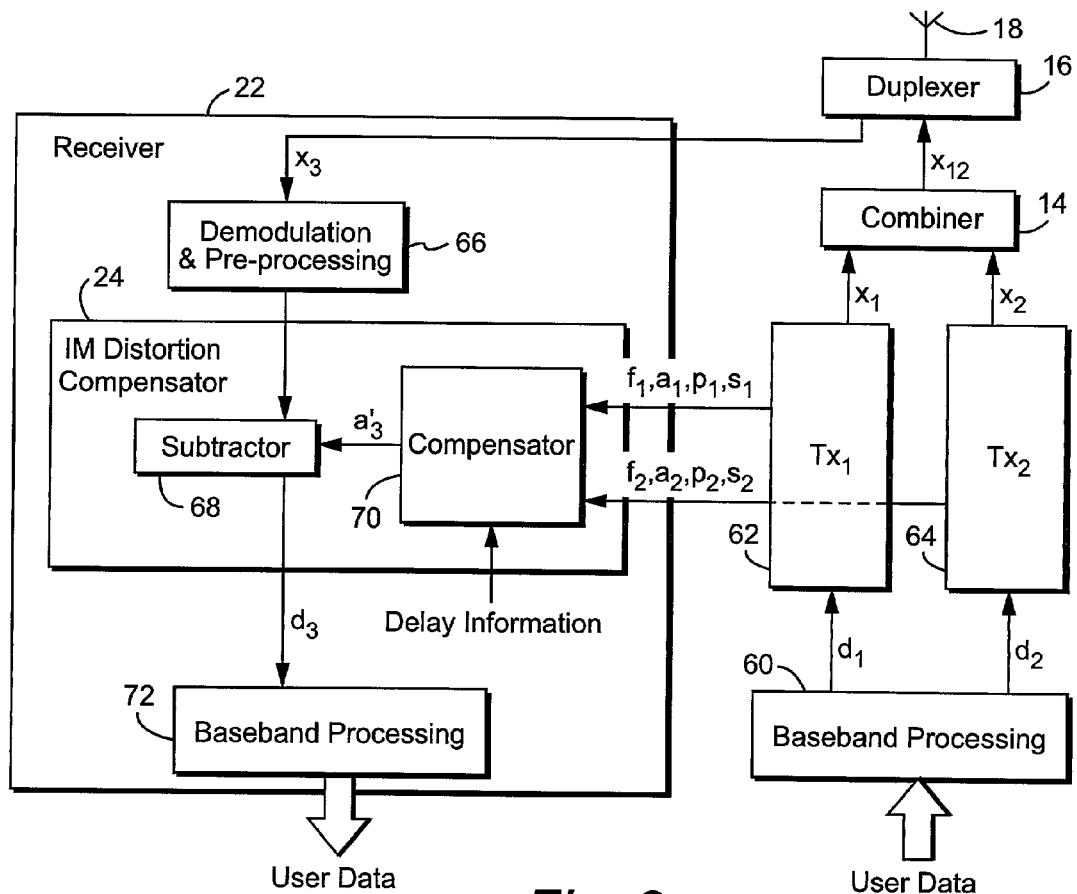
FIG. 3 illustrates one example embodiment for implementing intermodulation compensation.

FIG. 3 illustrates a non-limiting implementation for intermodulation distortion compensation that may be used, for example, in a radio base station. A baseband processing module 60 receives user data and performs baseband processing, including filtering, and perhaps other signal conditioning, and generates two digital data streams $d_1$ and $d_2$ provided to two corresponding transmitters $Tx_1$ 62 and $Tx_2$ 64. The transmitters 62 and 64 perform digital-to-analog conversion and modulate the baseband information in accordance with an appropriate modulation technique, (e.g., GMSK), onto an RF carrier in a corresponding transmit frequency, amplify the RF signal, and provide the amplified outputs $x_1$ and $x_2$ to the combiner 14. The combiner 14 provides a combined RF signal $x_{12}$ to the duplexer 16 for transmission over the antenna 18.

The antenna 18 also receives a signal in the receive band of receiver 22. The signal $x_3$ is sent from the duplexer 16 to a demodulation and preprocessing block 66. Such preprocessing may include, for example, filtering, analog-to-digital conversion, etc. The digital output of block 66, representing the received baseband signal, is provided to a subtractor 68 included in an IM distortion compensator 24. The IM distortion compensator 24 also includes a compensator block 70 which receives information associated with the first and second transmissions $x_1$ and $x_2$ provided by the transmitters $Tx_1$ and $Tx_2$. Specifically, each of the transmitters provides corresponding radio frequency ($f_2$, $f_2$), baseband digital information ($a_1$, $a_2$), transmit power ($p_1$, $p_2$), and transmit timing information ($s_1$, $s_2$) to the compensator 70. In this particular example embodiment, the baseband information $a_1$, $a_2$ is complex in nature and includes real and imaginary components. The compensator 70 also receives delay information for determining the time when the compensation signal $a_3'$ should be provided to the subtractor 68 where it is then subtracted from the received baseband signal. The output of the subtractor 68, corresponding to the compensated signal $d_3$, is provided to block 72 for further baseband processing and outputting of the user data.

One example way of calculating the compensation signal $a_3'$ is now described. First, the third order intermodulation distortion $f_{im3}$ is calculated in accordance with the following equation $f_{im3}=|m*f_1 \pm n*f_2|$ to identify those frequency pairs $f_1$, $f_2$ which are likely to produce third order intermodulation distortion products in the receive band. The non-linear behavior of the third order intermodulation distortion may be modeled in accordance with the following equation:

$$a_3 = \alpha*(a_1+a_2) + \beta*(a_1+a_2)^2 + \gamma*(a_1+a_2)^3 \qquad (1)$$

In equation (1), $a_3$ represents the compensation signal, which in this example, corresponds to the third order intermodulation distortion $f_{im3}$; $a_1$ and $a_2$ correspond to the complex, baseband signal information from transmitters $Tx_1$ and $Tx_2$; and $\alpha$, $\beta$, and $\gamma$ are unknown parameters whose values that must be measured or otherwise calculated, and later, perhaps adaptively reset should they change, e.g., due to aging, temperature, frequency dependence, etc.

Figure 4:
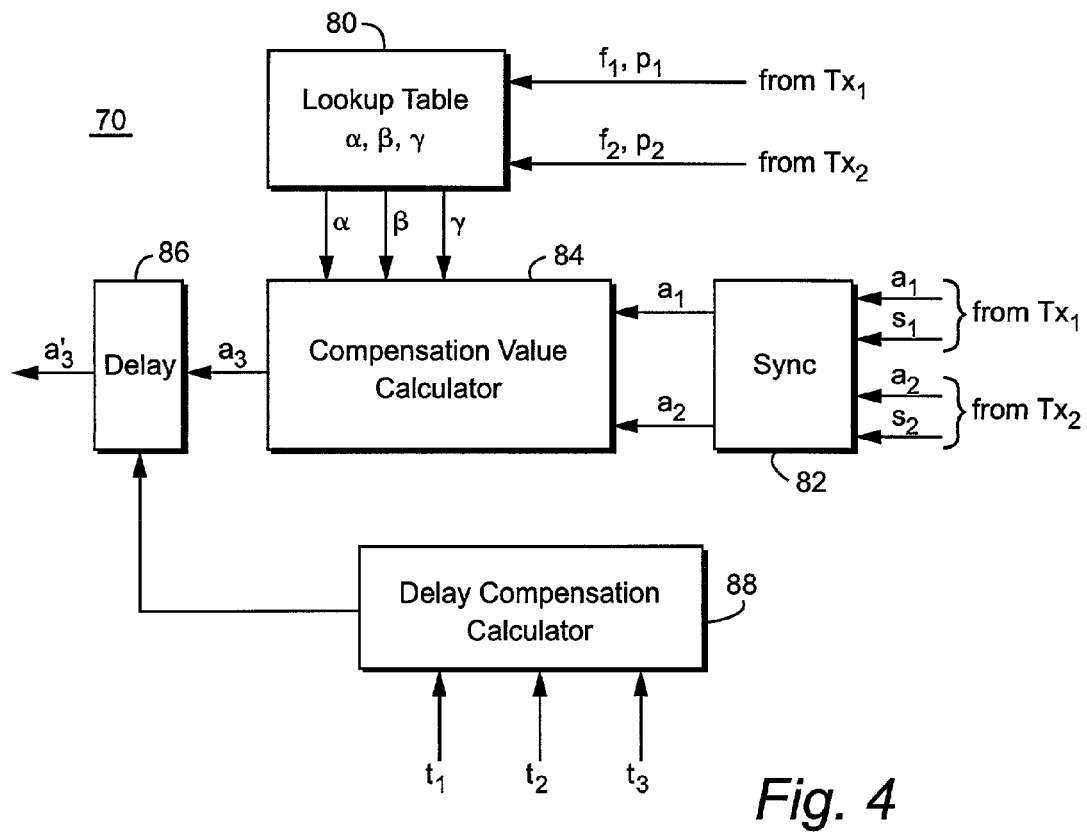
FIG. 4 illustrates another example embodiment for implementing intermodulation compensation.

One way to determine $a_3$ is explained as one example implementation for compensator 70 in conjunction with FIG. 4. A lookup table 80 is provided to store values of $\alpha$, $\beta$, and $\gamma$ for different combinations of frequency $f_1$, $f_2$ and power $p_1$, $p_2$ from the transmitter $Tx_1$ and $Tx_2$. The transmit power $p_1$ corresponds to the magnitude of the RF signal $x_1$, and the transmit power $p_2$ corresponds to the magnitude of the RF signal $x_2$ shown in FIG. 3. During a calibration procedure, various possible combinations of the baseband signals represented by $a_1$ and $a_2$ are generated, and the values for $\alpha$, $\beta$, and $\gamma$ are measured for each frequency $f_1$, $f_2$ and transmit power $p_1$, $p_2$ for each of the transmitters. For explanation purposes only, assume the modulation technique is the well-known GMSK, which provides four valid values to represent a particular baseband signal point in the complex domain. Sixteen ($2^4$) different combinations of two signal points $a_1$, $a_2$ are tested for each problematic (IM) frequency pair $f_1$, $f_2$ at each of several different output powers. For example, the GSM cellular system, there are sixteen different power steps differing by 2 dB. The result of this calibration process is that the values of $\alpha$, $\beta$, and $\gamma$ (for the example embodiment in FIG. 4) or $a_3$ (for the example embodiment in FIG. 5) are known for different combinations of $a_i$, $f_i$, and $p_i$, wherein i=1, 2, . . . , e.g., different combinations of $a_1$, $a_2$; $f_1$, $f_2$; and $p_1$, $p_2$. These combinations may be substituted in equation (1) to generate a system of equations that can be solved simultaneously using an appropriate computer program to determine the values of $\alpha$, $\beta$, and $\gamma$ for each combination of variables. Those values are then stored in the lookup table 80. Advantageously, these parameters may be varied or updated should the need arise, e.g., a recalibration is performed during a low traffic period to compensate for aging effects.

Once lookup table 80 is filled, the complex baseband information $a_1$ and $a_2$ from transmitters $Tx_1$ and $Tx_2$, respectively, is provided to the compensation value calculator 84 and "plugged in" for the $a_1$ and $a_2$ in equation (1). The $\alpha$, $\beta$, and $\gamma$ values are acquired from the lookup table 80 using the particular frequency pair $f_1$, $f_2$ and power levels $p_1$, $p_2$ provided by transmitters $Tx_1$ and $Tx_2$, respectively, associated with the values of $a_1$ and $a_2$ transmitted. The compensation value is then calculated and output by calculator 84 as signal $a_3$ to the delay block 86.

The IM compensation procedures should be synchronized so that the IM compensation value is calculated and removed at the appropriate time from the received signal. A first part of the timing process is described in conjunction with a synchronizer 82. The synchronizer 82 may be implemented in hardware, for example, a sample-and-hold or other latch that allows digital samples of the baseband complex data $a_1$, $a_2$ to be latched for a single symbol period identified as timing signals $s_1$ and $s_2$, respectively.

A second part of the timing process in the compensator 70 occurs in a delay block 86. In other words, the compensation value $a_3$ calculated for a particular symbol period "s" must be removed from the received signal information during the same symbol period "s" in the receiver. There are certain delays that need to be accounted for in the delay block 86. Accordingly, a delay compensation calculator 88 receives three different delays $t_1$, $t_2$, and $t_3$ as inputs. These delays $t_1$–$t_3$ are measured for a particular transceiver during a calibration process. The first and second delays, $t_1$ and $t_2$, respectively correspond to the amount of time it takes for the transmitters $Tx_1$ and $Tx_2$ to process the complex baseband information $a_1$ and $a_2$, generate signals $x_1$, $x_2$, combine those signals into $x_{12}$, route $x_{12}$ through the duplexer, and transmit it over the antenna. The delay $t_3$ accounts for the delay of the received signal in the receiver from the antenna 18, transmission through the duplexer 16 and the demodulation and preprocessing 66 before the received baseband signal is provided to the subtractor 68. The delay compensation calculator 86 provides a total delay based on $t_1$, $t_2$, and $t_3$ to a delay block 88 which delays the compensation value $a_3$ for that total delay period. After the delay period expires, delay block 86 outputs the compensation signal $a_3'$ to the subtractor 68 where it is subtracted from the received baseband signal to generate the compensated signal $d_3$ which is provided to further baseband processing 72.

Figure 5:
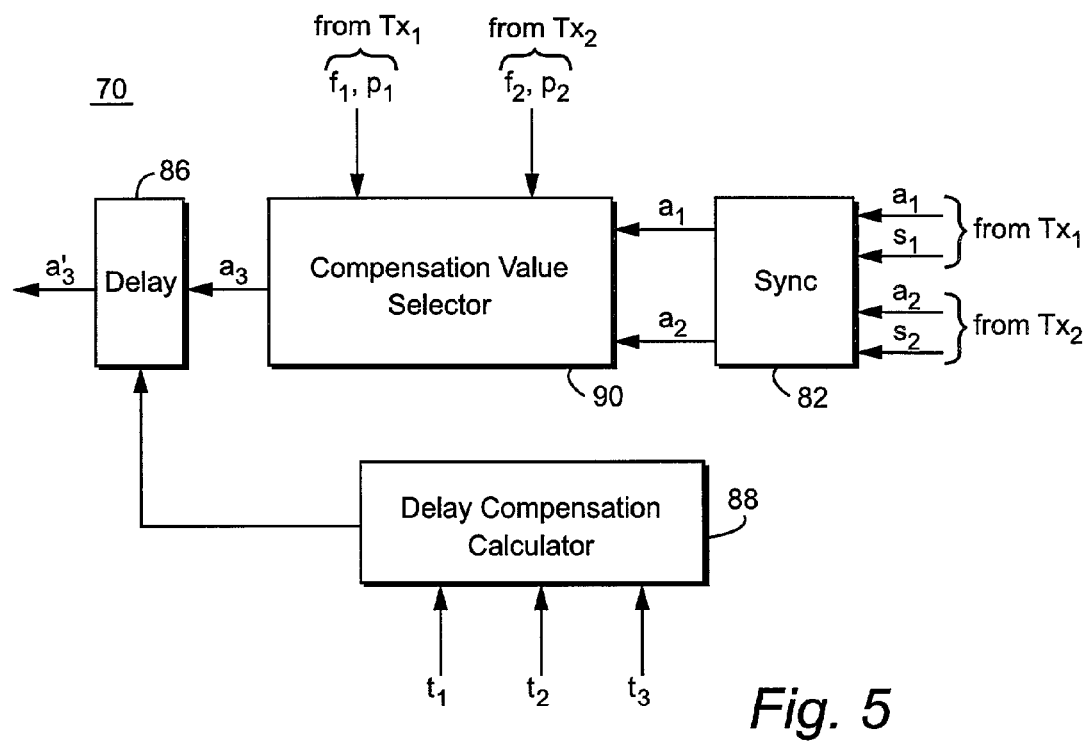
FIG. 5 illustrates yet another example implementation for intermodulation distortion compensation.

An alternative, example implementation of the compensator 70 is now described in conjunction with FIG. 5, where like reference numerals refer to like elements. This example implementation may be preferred because it does not require actual calculations in accordance with equation (1) to be made with $\alpha$, $\beta$, $\gamma$ and $a_1$ and $a_2$ to be made in real time in order to determine $a_3$. Instead, the off-line calibration process simply measures the intermodulation distortion value $a_3$ for each combination of the IM frequencies $f_1$ and $f_2$, the transmit powers $p_1$ and $p_2$, and the complex baseband input signals $a_1$ and $a_2$. In the GMSK example used above where there are sixteen possible combinations of $a_1$, $a_2$, the intermodulation distortion value $a_3$ is measured for each one of those sixteen combinations for each frequency pair where IM distortion will likely result and at each power level $p_1$ and $p_2$. The measured values of $a_3$ are stored in a lookup table in compensation value selector 90. In operation, the values $a_1$, $a_2$, $f_1$, $f_2$, $p_1$, $p_2$ are used as indices/addresses to lookup and output the corresponding value of $a_3$.

What is claimed is:

1. Apparatus comprising:
   one or more transmitters for transmitting first and second transmissions on first and second radio frequencies, respectively, where the first and second transmissions result in intermodulation distortion in a receive radio frequency band, and
   a compensator for compensating the intermodulation distortion using information associated with the first and second transmissions,
   wherein the compensator includes:
   a correction calculator for generating a correction factor that corresponds to the intermodulation distortion, and
   a subtractor for subtracting the correction factor from a signal received in the receive radio frequency band thereby suppressing the intermodulation distortion in the received signal,
   wherein the correction calculator is configured to generate the correction factor using first and second baseband data contained in the first and second radio transmissions, respectively, and
   wherein the correction calculator includes a synchronizer for synchronizing when the first and second baseband data are supplied to the correction calculator.

2. The apparatus in claim 1, wherein the first transmission is associated with a first transmitter and the second transmission is associated with a second transmitter.

3. The apparatus in claim 1, wherein the correction calculator is configured to generate the correction factor using first and second radio frequency output powers of the first and second transmissions, respectively.

4. The apparatus in claim 3, wherein the correction calculator is configured to generate a correction factor using the first and second radio frequencies.

5. The apparatus in claim 4, wherein the correction calculator is configured to generate the correction factor in accordance with the following equation:

$$a3 = \alpha^*(a_1+a_2) + \beta^*(a_1+a_2)^2 + \gamma^*(a_1+a_2)^3$$

where $a_3$ is the correction factor, $a_1$ and $a_2$ are the first and second baseband data, and $\alpha$, $\beta$, and $\gamma$ are parameters whose values may be adaptively set.

6. The apparatus in claim 5, wherein the values of $\alpha$, $\beta$, and $\gamma$ are stored in a lookup table and are retrievable using the first and second radio frequencies and the first and second radio frequency output powers.

7. The apparatus in claim 6, wherein the values of $\alpha$, $\beta$, and $\gamma$ are determined in a calibration process.

8. The apparatus in claim 6, wherein the values of a3 are determined in a calibration process.

9. The apparatus in claim 1, wherein the correction calculator includes a delay for synchronizing when the subtractor subtracts the correction factor from the received signal.

10. The apparatus in claim 9, wherein the delay is configured to compensate for one or more delays associated with the first and second transmissions.

11. The apparatus in claim 10, wherein the one or more delays include:
    a first delay associated with a time period for the first transmission to be processed and transmitted via an antenna,
    a second delay associated with a time period for the second transmission to be processed in a second transmitter and transmitted via the antenna, and
    a third delay associated with a time period for receiving the received signal and processing the received signal by the compensator.

12. The apparatus in claim 11, wherein the first and second baseband data are complex.

13. The apparatus in claim 1, wherein the apparatus is a radio transceiver.

14. The apparatus in claim 13, wherein the apparatus is a mobile radio.

15. The apparatus in claim 13, wherein the apparatus is a radio base station which includes:
    a first transmitter for generating the first transmission;

a second transmitter for generating the second transmission;

a combiner for combining the first and second transmissions into a combined signal;

a duplexer coupled to the combiner;

a receiver coupled to the duplexer; and an antenna coupled to the duplexer for transmitting the combined signal and receiving the received signal.

16. A receiver for receiving signals in a receive radio frequency band that includes intermodulation distortion caused by transmission of first and second signals on first and second radio frequencies by a transmitter, comprising:

radio receiving circuitry for receiving a received signal in the receive radio frequency band, and processing circuitry configured to compensate for the intermodulation distortion present in the received signal using information associated with the first and second signals provided by the transmitter, wherein the processing circuitry includes a calculator for generating a compensation signal using the information associated with the first and second signals and a combiner for reducing or removing the intermodulation distortion present in the received signal using the compensation signals, and a synchronizer for synchronizing a time when the compensation signal is combined with the received signal.

17. The receiver in claim 16, wherein the first and second signals are baseband signals.

18. The receiver in claim 17, wherein the baseband signals are complex.

19. The receiver in claim 17, wherein the processing circuitry is configured to generate a correction factor using first and second radio frequency output powers of the first and second signal transmissions.

20. The receiver in claim 19, wherein the processing circuitry is configured to generate a correction factor using the first and second frequencies.

21. The receiver in claim 20, wherein the processing circuitry is configured to generate a correction factor in accordance with the following equation:

$$a3 = \alpha^*(a_1+a_2) + \beta^*(a_1+a_2)^2 + \gamma^*(a_1+a_2)^3$$

where $a_3$ is the correction factor, $a_1$ and $a_2$ are first and second baseband signals, and $\alpha$, $\beta$, and $\gamma$ are parameters whose values may be adaptively set.

22. The receiver in claim 21, wherein the processing circuitry includes a memory for storing the values of $\alpha$, $\beta$, and $\gamma$ in a lookup table which are accessible using the first and second radio frequencies and the first and second radio frequency output powers.

23. The receiver in claim 22, wherein $\alpha$, $\beta$, and $\gamma$ are determined using a calibration process.

24. The receiver in claim 17, wherein the processing circuitry includes a memory for storing a compensation signal corresponding to each of plural combinations of first and second frequency output powers, first and second frequencies, and first and second baseband signals.

25. The receiver in claim 24, wherein the compensation signals are determined in a calibration process.

26. The receiver in claim 16, wherein the synchronizer includes:

a first delay associated with a time period for the first signal to be processed and transmitted via an antenna, a second delay associated with a time period for the second signal to be processed and transmitted via the antenna, and a third delay associated with a time period for receiving the received signal and processing the received signal by the compensator.

27. A receiver for receiving signals in a receive radio frequency band that includes intermodulation distortion caused by transmission of first and second baseband signals on first and second radio frequencies by a transmitter, comprising:

radio receiving circuitry for receiving a received signal in the receive radio frequency band, and processing circuitry configured to compensate for the intermodulation distortion present in the received signal using information associated with the first and second baseband signals provided by the transmitter including a calculator for generating a compensation signal using the information associated with the first and second signals, a synchronizer for synchronizing when the first and second baseband data are supplied to the calculator.

28. A method for compensating for intermodulation distortion in a received signal caused by transmission of first and second signals on first and second radio frequencies, comprising:

detecting the received signal, suppressing the intermodulation distortion in the received signal using information associated with the first and second signals including generating a correction factor that corresponds to the intermodulation distortion, subtracting the correction factor from the received signal, and synchronizing when the correction factor is subtracted from the received signal.

29. The method in claim 28, wherein the correction factor is generated using first and second baseband information carried on the first and second radio frequencies, respectively.

30. The method in claim 29, wherein the correction factor is determined using first and second radio frequency output powers corresponding to transmissions of the first and second signals on the first and second radio frequencies.

31. The method in claim 30, wherein the correction factor is calculated in accordance with the following equation:

$$a3 = \alpha^*(a_1+a_2) + \beta^*(a_1+a_2)^2 + \gamma^*(a_1+a_2)^3$$

where $a_3$ is the correction factor, $a_1$ and $a_2$ are the first and second baseband information, and $\alpha$, $\beta$, and $\gamma$ are parameters whose values may be adaptively set.

32. The method in claim 31, wherein the values of $\alpha$, $\beta$, and $\gamma$ are stored in a lookup table and accessed using the first and second radio frequencies and the first and second radio frequency output powers.

33. The method in claim 32, further comprising:

determining the values of $\alpha$, $\beta$, and $\gamma$ in a calibration process.

34. The method in claim 28, wherein the correction factor is determined for each of plural combinations of first and second frequency output powers, first and second frequencies, and first and second baseband information.

35. The method in claim 29, further comprising:

synchronizing when the first and second baseband information are used in generating the correction factor.

36. The method in claim 28, wherein the synchronizing compensates for one or more delays associated with the first and second signals.

37. Apparatus for compensating for intermodulation distortion in a received signal caused by transmission of first and second signals on first and second radio frequencies, comprising:
   means for detecting the received signal;
   means for suppressing the intermodulation distortion in the received signal using information associated with the first and second signals including:
   means for generating a correction factor that corresponds to the intermodulation distortion, and
   means for subtracting the correction factor from the received signal, and
   wherein the means for generating generates the correction factor in accordance with the following equation:

$$a3 = \alpha*(a_1+a_2) + \beta*(a_1+a_2)^2 + \gamma*(a_1+a_2)^3$$

where $a_3$ is the correction factor, $a_1$ and $a_2$ are first and second baseband signals, and $\alpha$, $\beta$, and $\gamma$ are parameters whose values may be adaptively set.

38. The apparatus in claim 37, wherein the means for generating generates the correction factor using first and second baseband information carried on the first and second radio frequencies, respectively.

39. The apparatus in claim 38, wherein the correction factor is determined using first and second radio frequency output powers of the first and second signals on the first and second radio frequencies.

40. The apparatus in claim 39, further comprising:
   means for synchronizing when the first and second baseband information are used in generating the correction factor.

41. The apparatus in claim 39, further comprising:
   means for synchronizing when the correction factor is subtracted from the received signal.

42. The apparatus in claim 41, wherein the means for synchronizing compensates for one or more delays associated with the first and second signals.

43. The apparatus in claim 37, further comprising:
   means for storing the values of $\alpha$, $\beta$, and $\gamma$ in a lookup table, and
   means for accessing the values of $\alpha$, $\beta$, and $\gamma$ using the first and second radio frequencies and the first and second radio frequency output powers.

44. The apparatus in claim 43, further comprising:
   means for determining the values of $\alpha$, $\beta$, and $\gamma$ in a calibration process.

45. The apparatus in claim 43, wherein the means for generating calculates a correction factor for each of plural combinations of the first and second frequency output powers, first and second frequencies, and first and second baseband signals.

* * * * *